Sept. 16, 1958 P. M. L. CHUET 2,851,826
MACHINE TOOLS FOR PLANING SURFACES
Filed June 23, 1954 4 Sheets-Sheet 2

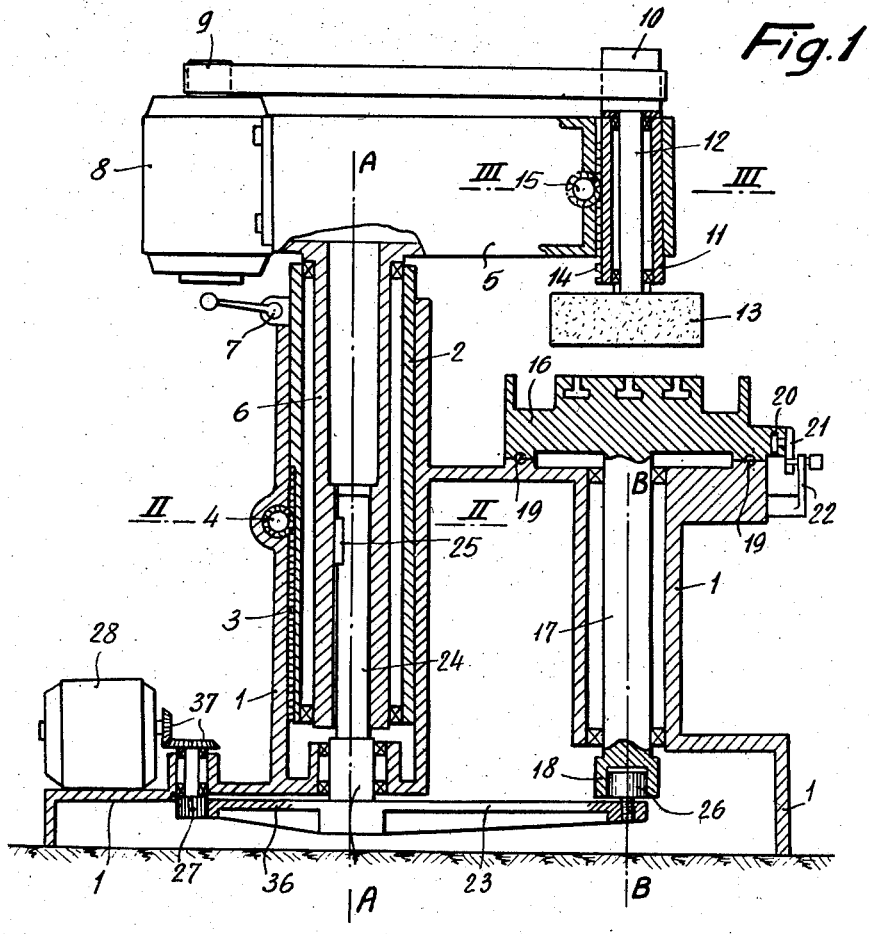
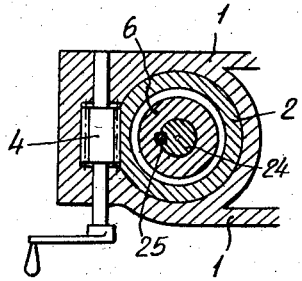
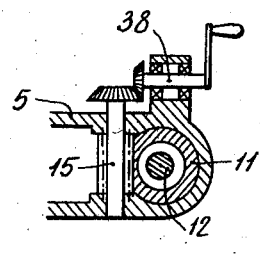

INVENTOR:
PIERRE MARIE LÉON CHUET
BY:

Sept. 16, 1958   P. M. L. CHUET   2,851,826
MACHINE TOOLS FOR PLANING SURFACES
Filed June 23, 1954   4 Sheets-Sheet 3

INVENTOR:
PIERRE MARIE LÉON CHUET
BY:

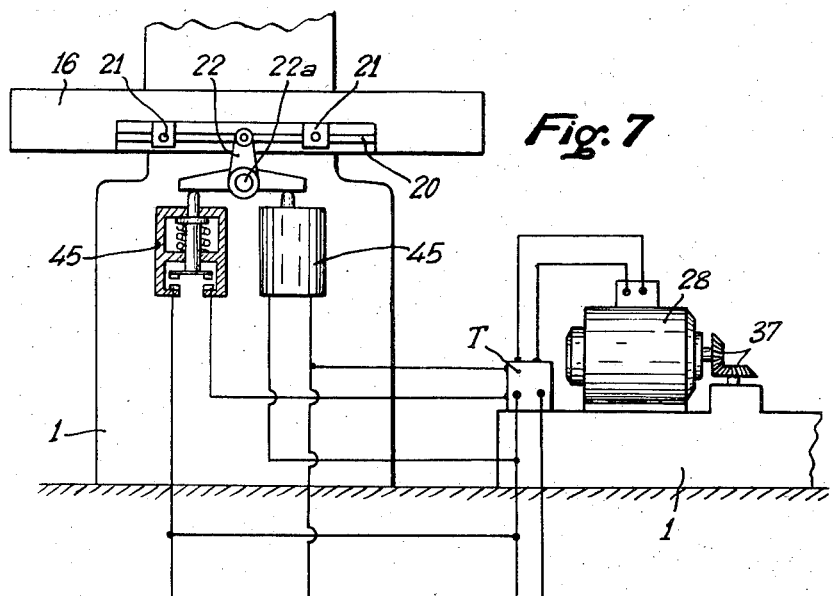
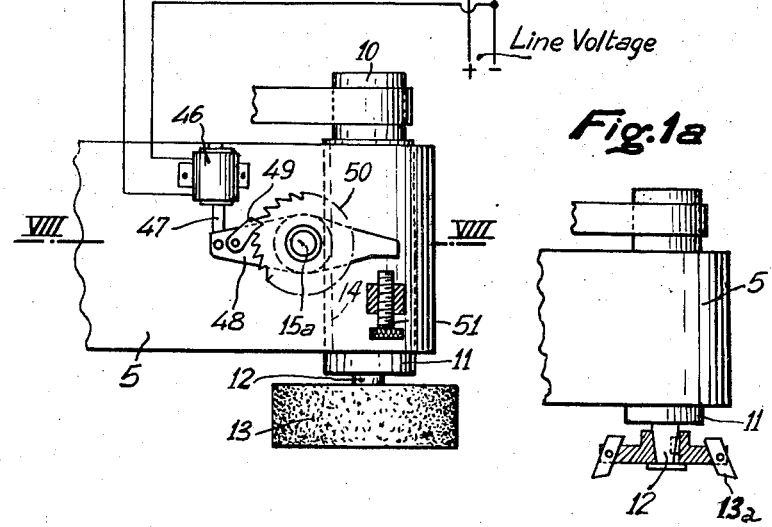
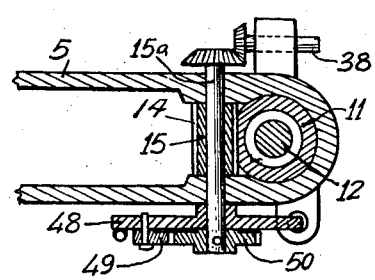

United States Patent Office 2,851,826
Patented Sept. 16, 1958

2,851,826

MACHINE TOOLS FOR PLANING SURFACES

Pierre Marie Léon Chuet, Nevers, France

Application June 23, 1954, Serial No. 438,744

Claims priority, application Germany June 29, 1953

12 Claims. (Cl. 51—55)

In certain machine tools for planing surfaces by means of grinding or milling with a rotary milling cutter, the article to be planed is placed on a horizontal table driven in a reciprocating translation motion while the planing tool located above the table is carried by a fixed upright.

This type of machine offers drawbacks, particularly a large bulk and serious difficulties for obtaining the reversal of the reciprocating motion of the table without any shock, in case the table is driven at a high speed.

In other machine tools for planing surfaces by grinding or milling, the article to be planed is placed on a fixed table, while the planing tool is mounted on an oscillating arm which moves along a circular arc above the table.

This type of machine is less cumbersome than the machines mentioned previously but the area of the article which can be planed is limited.

A particular object of the present invention is to obviate these drawbacks and it consists in a machine tool for planing surfaces by grinding or milling with a rotary milling cutter, in which the article to be planed is mounted on a table driven in a reciprocating pivoting motion about a fixed axis, while the planing tool is mounted on an arm, driven in a reciprocating pivoting motion about an axis parallel with the above mentioned fixed axis, the two reciprocating motions being synchronized mutually by mechanical means such as: lever and slide, lever and connecting rod, gears, etc.

The mechanical linking may be obtained in various manners.

Thus, for instance:

(a) In a first type of embodiment, one end of a lever associated with the pivoting axis of the tool carrying arm comprises an element cooperating with a rectilinear guide associated with the table and going through the pivoting axis of the table.

In particular, said element consists in a roller moving inside a groove forming the guide.

(b) In a second type of embodiment an arm associated with the pivoting axle of the tool carrying arm drives an arm associated with the pivoting axis of the object carrying table, through a connecting rod.

The oscillation motions of the tool carrying arm and of the plate may be controlled by a source of energy (electric motor, hydraulic control, manual control etc.) acting on said axles of rotation of the plate and of the tool carrying arm through the medium of the mechanical linking.

The reversal of the oscillation motions may be ensured by manual means or by automatic means.

Thus, for instance, in the latter case, tappets, secured in an adjustable manner on the table may actuate, when the latter pivots, a lever controlling the reversal of operation of the power source.

The adjustment of the tool in height may be obtained by a hand control and, if desired, by an automatic control added thereto.

In the case of an automatic control, the latter may be actuated by the motion of the lever for reversing the operation.

By way of examples only, the appended drawing represents diagrammatically:

Figure 1, a vertical section of a planing machine with a grinder carrying arm and a pivoting table connected together.

Fig. 1a is a fragmentary view of a machine tool according to the present invention in which the tool is in the form of a milling cutter.

Figure 2, the control for the height adjustment of the grinder carrying arm of this machine with respect to the table.

Figure 3, the control for the downward motion of the grinder carrying spindle.

Figure 4, a view of a portion of the machine represented in Figures 1 and 3.

Figures 5 and 6, two modified embodiments of the control for the grinder carrying arm and for the table.

Fig. 7 is a diagrammatic illustration of an automatic control arrangement, and

Fig. 8 is a sectional view taken on line VIII—VIII of Fig. 7.

Figure 4:
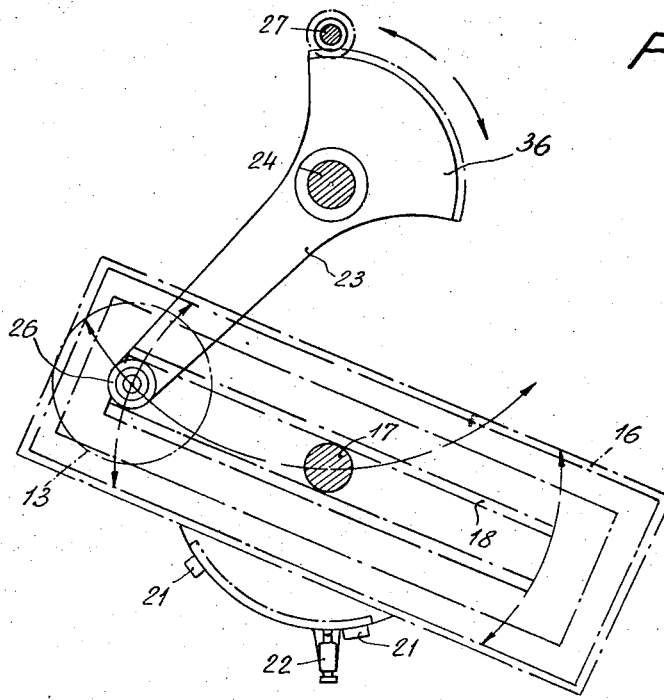

In the machine shown in Figures 1 to 4, a frame 1 supports the whole mechanism. A cylindrical bushing 2 slides inside a bore of this frame 1. The bushing carries a rack 3 which is controlled by a pinion 4 rotating in the frame 1 and making it possible to move this bushing vertically to vary its position with respect to the frame 1.

The bushing 2 may be locked in any one of its positions by a lever 7 and thus becomes associated with the frame. A grinder carrying arm 5, provided with a hollow shaft 6 is mounted inside the bushing 2 and can pivot inside this bushing.

On this grinder carrying arm 5 an electric motor 8 is attached, which, by means of a belt passing over pulleys 9 and 10 drives in rotation a grinder carrying spindle 12 on which a grinder or other tool 13 is secured. As is shown in Fig. 1a, the tool may be in the form of a milling cutter 13a.

The grinder carrying spindle 12 rotates inside a cylindrical bushing 11 which carries a rack 14 and which can, by means of a pinion 15 rotating in the grinder carrying arm 5, move vertically with respect to it.

The vertical displacement of this grinder carrying bushing 11 may be obtained, on the one hand by a hand control (Figure 3) and on the other hand by an automatic control which is more fully described below.

A table 16 associated with a shaft 17 rests on the frame 1 by means of ball bearings 19 and can pivot about the axis of the shaft 17 on the frame 1. The lower end of the shaft 17 carries a rectangular slide 18 (Figs. 1 and 4).

This table 16 also carries a T-shaped groove 20 in which can be secured in suitably chosen positions two tappets 21 which come in contact with the lever 22 carried by the frame 1 by means of an axle about which it can pivot.

On the other hand, a lever 23 carrying a toothed sector 36 is associated with a pivot 24 located in a housing of the frame 1 coaxial with the bore containing the bushing 2. The pivot 24 is associated operationally with the hollow shaft 6 of the grinder carrying arm 5 by a key 25 which slides in a groove provided in the hollow shaft, in such a manner that any rotation of the lever 23 causes an equal rotation of the grinder carrying arm 5. The end of the lever 23 opposite that which carries the sector 36 carries a roller 26 which rolls without any play in the slide 18 associated with the table 16.

A pinion 27, rotating in the frame 1 is controlled by means of a set of conical pinions 37 by a motor 28 and gears with the toothed sector 36 and thus rotates the lever 23 about the pivot 24, driving in rotation the grinder carrying arm 5 and the table 16. A control, actuated by the lever 22, reverses the direction of rotation of the motor 28 every time the lever 22 strikes one of the stops 21 so that it is possible to adjust the amplitude of the oscillating motion of the lever 23 of the grinder carrying arm 5 and of the table 16.

The operation of this machine is as follows:

The grinder carrying arm 5 is adjusted in height with respect to the table 16 and locked by the lever 7. The grinding wheel 13 is adjusted in height accurately with respect to the table 16 by means of the control 38 of the spindle holder 11. The motor 28 is started in operation; the grinder carrying arm 5 and the table 16 carry out oscillating motions.

When one of the tappets 21 comes in contact with the lever 22, the latter is tipped and reverses the direction of rotation of the motor 28 and controls the downward motion of the spindle 12 by a predetermined amount. The assembly of the arm 23 and table 16 starts again in the other direction. The amplitude of the oscillating motions is determined by the positions of the tappets 21, as is more fully described below.

Thus the grinding wheel 13 sweeps over an area limited by two circles the centers of which are on the pivoting axis A—A of the grinder carrying arm 5 and which are tangent, one inside and one outside, to the grinding wheel 13. The article to be planed takes up a position on this area due to the complementary motion of the table 16 which carries it and which pivots about the axis B—B of the shaft 17 parallel with the axis A—A. The article is thus presented to the work of the grinding wheel 13.

Figure 5:
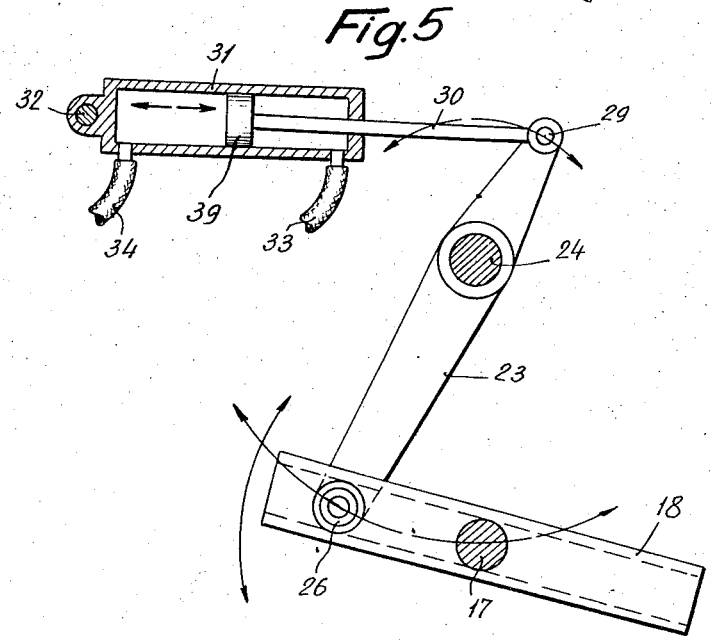

In the case of Figure 5, the control represented in Figure 4 is replaced by a hydraulic control. The latter comprises a cylinder 31 pivoting about an axle 32 secured on the frame 1 and containing a piston 39, the rod of which 30 slides inside the cylinder 31 and actuates, by means of an axle 29, the lever 23. The oil is fed into the cylinder 31 through two hoses 33 and 34 and the reversal of the oil arrival is ensured as in the case of the electric control by the lever 22 which gives the grinder-carrying arm 5 and the table 16 their synchronized reciprocating motions.

Figure 6:
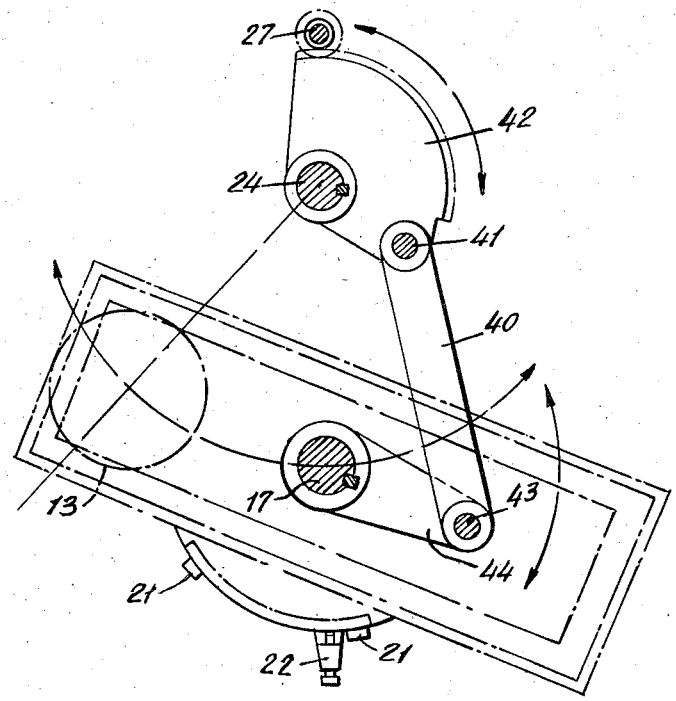

In the case of Figure 6, the control represented in Figure 4 is replaced by a control using a connecting rod and a crankarm. The elements common to the controls shown in figures 4 and 6 are designated by the same reference numerals. The lever 23 and the toothed sector 36 are replaced by a connecting rod 40 articulated on the one hand with an axle 41 carried by a toothed sector 42, keyed on the shaft 24 and actuated by a pinion 27 and, on the other hand, with an axle 43 carried by an arm 44 keyed on the shaft 17. It will be quite obvious that the pivoting motions of the grinder carrying arm 5 and table 16 are synchronized by the assembly: connecting rod 40, arm 44 and toothed sector 42. Figs. 7 and 8 schematically illustrate an automatic control arrangement for reversing the direction of rotation of the motor 28 every time the lever 22 strikes one of the stops 21. As is best shown in Fig. 7, the lever 22 is pivotable about an axle 22a and cooperates with two switches 45 each of which is spring-biased to open position. The switches are connected in circuit with a suitable line voltage as well as with a control box T, the arrangements of the parts being such that whenever one of the switches 45 is closed, the direction of rotation of the motor 28 is automatically reversed. Thus, reversal of the motor occurs whenever the table 16 has reached a desired end position, and the amplitude of oscillation of the table 16 can be controlled by adjusting the position of the stops 21 within the groove 20.

The control arrangement further includes means for gradually lowering the work tool upon each reciprocation of the table. These means include an electromagnet 46 connected in circuit with the line voltage and the switches 45, the armature 47 of this electromagnet being pivotally connected to one end of an arm 48 which is freely turnable on the axle 15a carrying the pinion 15. The arm 48 carries a pawl 49 which cooperates with a ratchet wheel 50, the latter being fixedly mounted on the axle 15a for rotation therewith. Thus, whenever the electromagnet 46 is energized, the armature 47 is attracted and this causes the arm 48 to rotate in clockwise direction, as viewed in Fig. 7, thereby turning the ratchet wheel 50, and with it the axle 15a and the pinion 15, throughout a certain angular distance. This, in turn, causes the rack 14, and with it the work tool 13, to be moved downwardly a distance corresponding determined by the angular rotation of the pinion 15.

If desired, an adjustable abutment screw 51 may be provided for limiting the maximum swing of the arm 48 under the influence of the electromagnet and armature 46, 47. In this way, the distance which the work tool is advanced upon each reciprocation of the table 16 may be adjusted.

It will be understood that each of the elements described above, or two or more together, may also find a useful application in other types of machine tools differing from the types described above.

While the invention has been illustrated and described as embodied in a machine tool using a grinding wheel it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A machine tool comprising, in combination, support means; a support member having a receiving portion adapted to receive a work piece and being mounted on said support means for pivotal movement relative thereto about a first axis; work tool means for working a work piece received by said receiving portion of said support member and being mounted on said support means for pivotal movement relative thereto about a second axis parallel to said first axis; and moving means connected to said support member and to said work tool means for simultaneously pivoting both about said first and second axes, respectively, in such a manner that said work tool means moves to and fro along the same path relative to a work piece received by said receiving portion of said support member.

2. A machine tool comprising, in combination, support means; a support member having a receiving portion adapted to receive a work piece and being mounted on said support means for pivotal movement relative thereto about a first axis; work tool means for working a work piece received by said receiving portion of said support member and being mounted on said support means for pivotal movement relative thereto about a second axis parallel to said first axis; and moving means connected to said support member and to said work tool means for simultaneously pivoting both about said first and second axes, respectively, in such a manner that said work tool means moves substantially rectilinearly relative to said receiving portion of said support member.

3. A machine tool comprising, in combination, support means; a support member having a receiving portion adapted to receive a work piece and being mounted on said support means for pivotal movement relative thereto about a first axis; work tool means for working a work piece received by said receiving portion of said support member and being mounted on said support means for pivotal movement relative thereto about a second axis parallel to said first axis and along an arcuate path passing through said first axis; and moving means connected to said support member and to said work tool means for simultaneously pivoting both about said first and second axes, respectively, in such a manner that said work tool means moves to and fro along the same rectilinear path relative to a work piece received by said receiving portion of said support member.

4. A machine tool comprising, in combination, support means; a support member having a receiving portion adapted to receive a work piece and being mounted on said support means for pivotal movement relative thereto about a first axis; work tool means for working a work piece received by said receiving portion of said support member and being mounted on said support means for pivotal movement relative thereto about a second axis parallel to said first axis and along an arcuate path passing through said first axis; and moving means connected to said support member and to said work tool means for simultaneously pivoting both about said first and second axes, respectively, in such a manner that said work tool means moves substantially rectinearly relative to said receiving portion of said support member.

5. A machine tool comprising, in combination, support means; a support member having a receiving portion adapted to receive a work piece and being mounted on said support means for pivotal movement relative thereto about a first axis; work tool means for working a work piece received by said receiving portion of said support member and being mounted on said support means for pivotal movement relative thereto about a second axis parallel to said first axis and along an arcuate path passing through said first axis; and moving means connected to said support member and to said work tool means for simultaneously pivoting both about said first and second axes, respectively, in such a manner that said work tool means moves substantially rectilinearly relative to said* receiving portion of said support member, said moving means including link means connected to said work tool means for movement therewith about said second axis, and motion transmitting means connected to said link means and to said support member for imparting pivotal movement to the latter about said first axis during pivotal movement of said work tool means about said second axis.

6. A machine tool comprising, in combination, support means; a support member having a receiving portion adapted to receive a work piece and being mounted on said support means for pivotal movement relative thereto about a first axis; work tool means for working a work piece received by said receiving portion of said support member and being mounted on said support means for pivotal movement relative thereto about a second axis parallel to said first axis and along an arcuate path passing through said first axis; and moving means connected to said support member and to said work tool means for simultaneously pivoting both about said first and second axes, respectively, in such a manner that said work tool means moves substantially rectilinearly relative to said receiving portion of said support member, said moving means including link means connected to said work tool means for movement therewith about said second axis, motion transmitting means connected to said link means and to said support member for imparting pivotal movement to the latter about said first axis during pivotal movement of said work tool means about said second axis, and mover means for oscillating said link means about said second axis.

7. A machine tool comprising, in combination, support means; a support member having a receiving portion adapted to receive a work piece and being mounted on said support means for pivotal movement relative thereto about a first axis; work tool means for working a work piece received by said receiving portion of said support member and being mounted on said support means for pivotal movement relative thereto about a second axis parallel to said first axis and along an arcuate path passing through said first axis; and moving means connected to said support member and to said work tool means for simultaneously pivoting both about said first and second axes, respectively, in such a manner that said work tool means moves substantially rectilinearly relative to said receiving portion of said support member, said moving means including link means connected to said work tool means for movement therewith about said second axis, motion transmitting means connected to said link means and to said support member for imparting pivotal movement to the latter about said first axis during pivotal movement of said work tool means about said second axis, and mover means for oscillating said link means about said second axis, said mover means including motor means and gear means interconnecting said motor means and said link means.

8. A machine tool comprising, in combination, support means; a support member having a receiving portion adapted to receive a work piece and being mounted on said support means for pivotal movement relative thereto about a first axis; work tool means for working a work piece received by said receiving portion of said support member and being mounted on said support means for pivotal movement relative thereto about a second axis parallel to said first axis and along an arcuate path passing through said first axis; and moving means connected to said support member and to said work tool means for simultaneously pivoting both about said first and second axes, respectively, in such a manner that said work tool means moves substantially rectilinearly relative to said receiving portion of said support member, said moving means including link means connected to said work tool means for movement therewith about said second axis, motion transmitting means connected to said link means and to said support member for imparting pivotal movement to the latter about said first axis during pivotal movement of said work tool means about said second axis, and mover means for oscillating said link means about said second axis, said mover means including motor means and gear means interconnecting said motor means and said link means and automatic control means connected to said motor means for changing the direction in which said motor means pivots said link means when said support member has been pivoted a predetermined amount about said first axis.

9. A machine tool as defined in claim 8 wherein said automatic control means includes switch means mounted on said support means and electrically connected to said motor means, and switch actuating means on said support member and adapted to engage said switch means for actuating the same in such a manner so as to cause said motor means to pivot said link means in a different direction when said link means has pivoted said support member a predetermined amount about said first axis.

10. A machine tool comprising, in combination, support means; a support member having a receiving portion adapted to receive a work piece and being mounted on said support means for pivotal movement relative thereto about a first axis; work tool means for working a work piece received by said receiving portion of said support member and being mounted on said support means for pivotal movement relative thereto about a second axis parallel to said first axis and along an arcuate path passing through said first axis; and moving means connected to said support member and to said work tool means for simultaneously pivoting both about said first and second axes, respectively, said moving means including link means connected to said work tool means for movement therewith about said second axis, and motion transmitting means connected to said link means and to said support member for imparting pivotal movement to the latter about said first axis during pivotal movement of said work tool means about said second axis, said motion transmitting means including an elongated channel-shaped receiving portion connected to said support member for pivotal movement therewith about said first axis, extending in a direction normal to said first axis and passing therethrough, and a guide member on said link means, spaced from said second axis a distance equal to the distance between said first and second axes and adapted to be received by said receiving portion, whereby said work tool means moves rectilinearly relative to said receiving portion of said support member.

11. A machine tool as defined in claim 10 wherein said guide member is a roller member mounted on said link member for turning movement about a turning axis parallel to said second axis and spaced said distance therefrom.

12. A machine tool comprising, in combination, support means; a support member having a receiving portion adapted to receive a work piece and being mounted on said support means for pivotal movement relative thereto about a first axis; work tool means for working a work piece received by said receiving portion of said support member and being mounted on said support means for pivotal movement relative thereto about a second axis parallel to said first axis and along an arcuate path passing through said first axis; and moving means connected to said support member and to said work tool means for simultaneously pivoting both about said first and second axes, respectively, in such a manner that said work tool means moves substantially rectilinearly relative to said receiving portion of said support member, said moving means including a lever member connected at a point intermediate its ends to said work tool means for movement therewith about said second axis, motion transmitting means connected to said support member and to said lever member at one end thereof for imparting pivotal movement to said support member about said first axis during pivotal movement of said work tool means about said second axis, and mover means connected to the other end of said lever member for oscillating the same about said second axis.

References Cited in the file of this patent

UNITED STATES PATENTS

| | | |
|---|---|---|
| 529,013 | Barnes | Nov. 13, 1894 |
| 1,513,390 | Hacker | Oct. 28, 1924 |
| 1,836,853 | Laffineur | Dec. 15, 1931 |
| 2,275,061 | Indge | Mar. 3, 1942 |
| 2,352,386 | Holman | June 27, 1944 |
| 2,498,012 | Sjostrand | Feb. 12, 1950 |

FOREIGN PATENTS

| | | |
|---|---|---|
| 244,291 | Switzerland | Sept. 15, 1946 |
| 567,746 | Great Britain | Mar. 1, 1945 |
| 668,339 | Great Britain | Mar. 12, 1952 |